United States Patent [19]

Kawamura et al.

[11] Patent Number: 4,750,364

[45] Date of Patent: Jun. 14, 1988

[54] ANGULAR VELOCITY AND ACCELERATION SENSOR

[75] Inventors: Yoshio Kawamura, Kokubunji; Kazuo Sato, Suginami; Tsuneo Terasawa, Hachioji; Shinji Tanaka, Kodaira, all of Japan

[73] Assignee: Hitachi, Ltd., Tokyo, Japan

[21] Appl. No.: 920,426

[22] Filed: Oct. 20, 1986

[30] Foreign Application Priority Data

Oct. 21, 1985 [JP] Japan .................. 60-233405

[51] Int. Cl.$^4$ .................. G01P 15/08; G01P 9/04
[52] U.S. Cl. .................. 73/510; 73/505; 73/517 R; 73/517 AV
[58] Field of Search .................. 73/505, 510, 517 AV, 73/517 R; 331/156

[56] References Cited

U.S. PATENT DOCUMENTS

| | | | |
|---|---|---|---|
| 2,544,646 | 3/1951 | Barnaby et al. | 73/505 |
| 2,974,530 | 3/1961 | Jaouen | 73/505 |
| 3,913,405 | 10/1975 | Ljung et al. | 73/505 |
| 4,538,461 | 9/1985 | Juptner et al. | 73/505 |
| 4,592,233 | 6/1986 | Peters | 73/510 |
| 4,654,663 | 3/1987 | Alsenz et al. | 73/505 |
| 4,674,331 | 6/1987 | Watson | 73/505 |

*Primary Examiner*—John Chapman
*Attorney, Agent, or Firm*—Antonelli, Terry & Wands

[57] ABSTRACT

The specification discloses an angular velocity and acceleration sensor in which a tuning-fork oscillator is vibrated on the main driven vibrating axis and displacement on an axis which is parallel to the main driven vibrating axis or displacement which crosses it at right angles is detected so that at least one of angular velocity and acceleration on an axis which is parallel to the main driven vibrating axis or which crosses it at right angles may be detected. The sensor is characterized in that vibrating reeds of the tuning-fork oscillator are so formed that the spring constant of the vibrating reeds on the main driven vibrating axis is substantially equal to that on the axis which crosses the main driven vibrating axis at right angles.

8 Claims, 6 Drawing Sheets

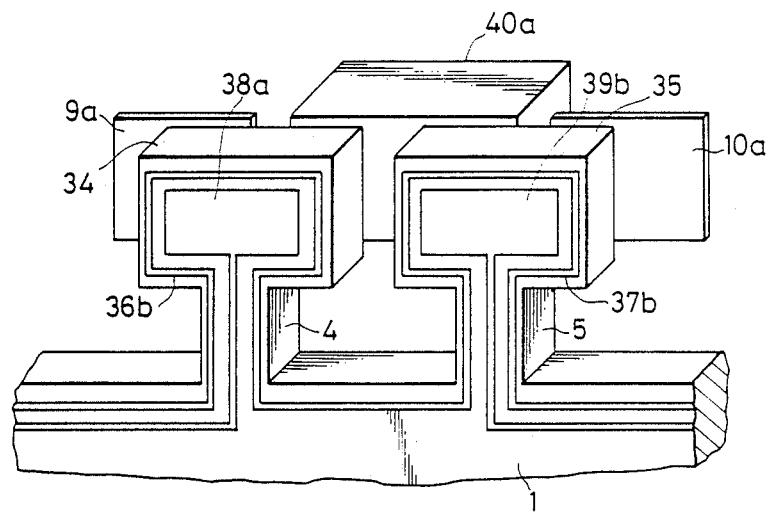
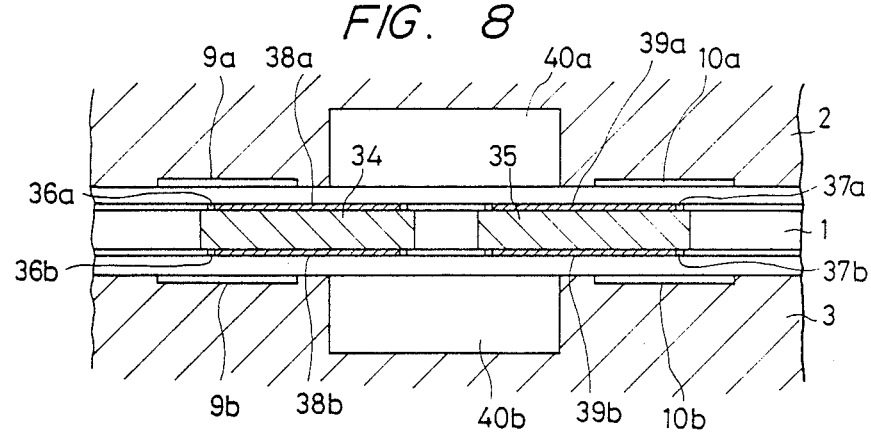

ANGULAR VELOCITY AND ACCELERATION SENSOR

BACKGROUND OF THE INVENTION

The present invention relates to an angular velocity and acceleration sensor for sensing at least one of angular velocity and acceleration.

Gyroscopes are employed as angular velocity and acceleration sensors for sensing angular velocity and acceleration which are necessary when obtaining information such as the location, direction, position, and velocity of a moving vehicle. Gyroscopes of the vibration type have attracted attention from the viewpoint of low cost and high reliability and one of these vibration-type gyroscopes uses a tuning-fork oscillator.

FIG. 11 is a perspective view showing a portion of an angular velocity and acceleration sensor (disclosed in Japanese patent Laid-Open No. 47913/1985) which uses a conventional tuning-fork oscillator. In this figure, reference number 61 denotes a base, reference numbers 62, 63 vibrating reeds fixed to the base 61, reference numbers 64, 65 mounting-plates mounted on the upper portions of the vibrating reeds 62, 63, and reference numbers 66, 67 vibrating reeds the lower portions of which are mounted on the mounting-plates 64, 65. Each of the vibrating reeds 62, 63, 66, 67 is formed such that the vibrating reeds 62, 63 can vibrate on the main driven vibrating axis, that is to say, the x-axis, and the vibrating reeds 66, 67 can vibrate in the direction which crosses the main driven vibrating axis at right angles, that is to say, the y-axis, and such that the resonance frequency of the vibrating reeds 62, 63 is equal to that of the vibrating reeds 66, 67. By enabling resonance of each of the vibrating reeds, it becomes possible to obtain a large output displacement with a small input.

In this angular velocity and acceleration sensor, when an angular velocity $\Omega$ is produced around the axis z which crosses the xy plane at right angles in the state of the vibrating reeds 62, 63 being vibrated at a resonance frequency $\omega$ in opposite directions on the x-axis, Coriolis force F which is proportional to the angular velocity $\Omega$ acts on the vibrating reeds 66, 67. In this case, when the amplitude of the vibration on the x-axis is shown by a and time is shown by t, the location x of the vibrating reeds 66, 67 is expressed by the following equation:

$$x = a \sin\omega t \qquad (1)$$

Therefore, the relative velocity $\dot{x}$ of the vibrating reeds 66, 67 on the x-axis relative to the base 61 is expressed by the following equation:

$$\dot{x} = a\omega \cos\omega t \qquad (2)$$

Thus, if the mass of the vibrating reeds 66, 67 is shown by m, Coriolis force F is expressed by the following equation:

$$F = 2m\Omega\dot{x} = \Omega 2 m a \omega \cos\omega t \qquad (3)$$

As seen from the equation (3), when the Coriolis force F acts, the vibrating reeds 66, 67 are vibrated in opposite directions to each other on the ÿ-axis. Since the amplitude is proportional to the angular velocity $\Omega$, the angular velocity $\Omega$ can be determined by sensing the amplitude of the vibrating reeds 66, 67. The amplitude can be sensed as an electrical output which is proportional to the transformed displacement of piezoelectric materials stuck to the flat elements of the vibrating reeds 66, 67. When an acceleration ÿ is produced on the ÿ-axis, the vibrating reeds 66, 67 are transformed in proportion to the acceleration ÿ in the same direction on the ÿ-axis and the acceleration ÿ can be sensed by sensing the transformed displacement of the vibrating reeds 66, 67. This transformed displacement can be obtained as the output from the same piezoelectric material as in the amplitude. The angular velocity can be obtained by summing the outputs of the vibrating reeds and the acceleration can be obtained by subtracting the output of one vibrating reed from that of the other.

As described above, in a vibration-type gyroscope, it is necessary to equalize the resonance frequency of the vibrating reeds on the x-axis to that on the ÿ-axis, as well as the resonance frequencies of all the vibrating reeds in a group. A resonance frequency f of vibrating reeds is expressed as follow:

$$f \alpha \sqrt{\frac{k}{m}} \; \alpha \sqrt{\frac{bh^3/l^3}{bhl}} = \frac{h}{l^2} \qquad (4)$$

an error rate is expressed as follows:

$$\frac{df}{f} = \frac{dh}{h} - 2\frac{dl}{l} \qquad (5)$$

and the error rate of the resonance frequency becomes 3 times the dimensional error rate of a vibrating reed, wherein k denotes the spring constant of a vibrating reed, m the mass, and b, h, and l, the width, the thickness, and the length of a vibrating reed, respectively. The equation (4) is established with the proviso that there is no error in the mass of the mounting-plates 64, 65. An error rate in terms of resonance frequency of 1% or less is required and the smaller the vibrating reeds, that is, the smaller the absolute value of l and h, the smaller the value of the permissible error.

Therefore, in such a conventional angular velocity and acceleration sensor, since the vibrating reeds 62, 63, and the vibrating reeds 66, 67 are mounted on the base 61 with the mounting-plates 64, 65 interposed therebetween, this sensor has a complicated structure, is difficult to work and assemble, and easily produces errors during assembly, resulting in poor detection accuracy and difficulties in achieving miniaturization.

SUMMARY OF THE INVENTION

The present invention has been achieved for the purpose of solving the above problem, and an object of the present invention is to provide an angular velocity and acceleration sensor which has a simple structure, is easily worked and assembled, exhibits high deteciton accuracy, and enables miniaturization.

In order to attain this object, an angular velocity and acceleration sensor of the present invention employs a tuning-fork oscillator having a structure in which two vibrating reeds with the same resonance frequency are arrayed (considered, for example, as the x-axis), and this oscillator is vibrated on the main driven vibrating axis (x-axis) so as to detect at least one of angular velocity and acceleration as the amplitude and the phase difference of vibration in the direction crossing the main vibration at right angles or being parallel thereto by detecting the displacement in the detection direction crossing the main vibrating direction of the tuning-fork oscillator at right angles (y-axis) or being parallel thereto (x-axis), the spring constant in the main vibration of the vibrating reeds being substantially equalized with that in the detection direction in order to equalize the resonance frequencies in both vibration directions (x, y-axes) of the tuning-fork oscillator, the tuning-fork oscillator being accommodated in a vacuum environment within a vacuum vessel of, for example, 0.1 Torr or less, so that any effect on the oscillator produced by the damping force due to the environmental pressure is eliminated.

BRIEF DESCRIPTION OF THE DRAWINGS

FIG. 7 is a schematic functional diagram showing a portion of yet another angular velocity and acceleration sensor to which the present invention relates;

FIG. 8 is a plan sectional view of the sensor shown in FIG. 7;

DETAILED DESCRIPTION OF THE PREFERRED EMBODIMENTS

Example 1

Figure 1:
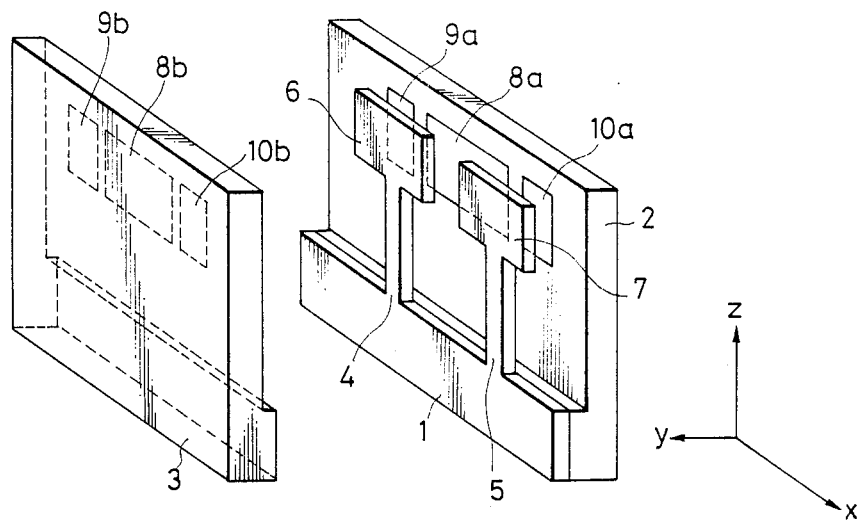
FIG. 1 is an exploded functional diagram showing a portion of an angular velocity and acceleration sensor to which the present invention relates.
Figure 2:
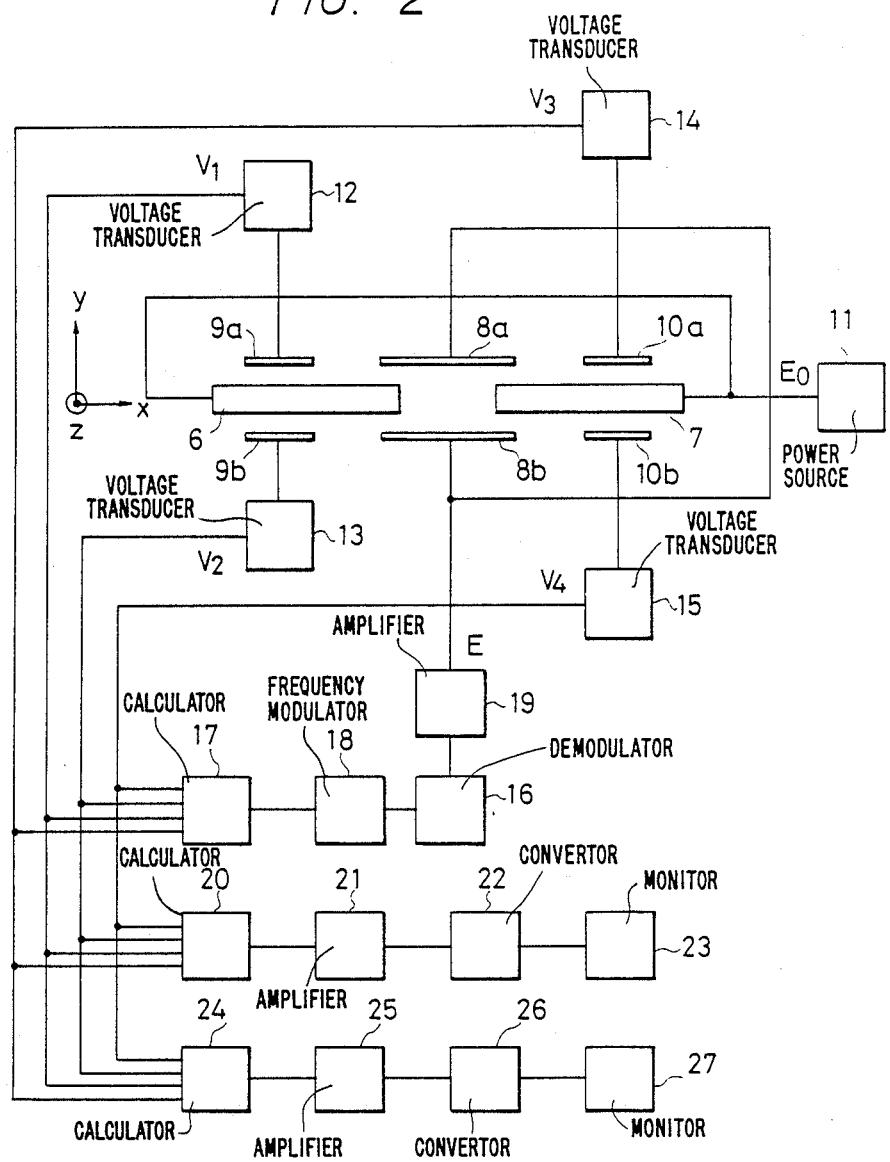
FIG. 2 is a block diagram of the detection circuit of the angular velocity and acceleration sensor shown in FIG. 1.

FIG. 1 is an exploded functional diagram showing a portion of an angular velocity and acceleration sensor to which the present invention relates, and FIG. 2 is a block diagram of the detection circuit of the angular velocity and acceleration sensor shown in FIG. 1. In FIG. 1, reference number 1 denotes a base, reference numbers 2, 3 denote electrode substrates which are adhered to the base 1. Reference numbers 4, 5 denote vibrating reeds provided on the base 1, the vibrating reeds having a spring constant on the x-axis which is substantially equal to that on the y-axis. The vibrating reeds 4, 5 have the dimension 0.16×0.16×2 mm and are integrally formed. Reference numbers 6, 7 denote flat elements having flat surfaces provided on the upper portions of the vibrating reeds 4, 5, the flat elements 6, 7 being parallel to the main vibrating plane (xz plane) and having the dimension 2×2×0.16 mm. The vibrating reeds 4, 5 and the flat elements 6, 7 consist of single Si crystals. Reference numbers 8a, 8b denote driven electrodes provided on the electrode substrates 2, 3, respectively, and reference numbers 9a, 10a, 9b, 10b denote detection electrodes provided on the electrode substrates 2, 3. The vibrating reeds 4, 5 and the flat elements 6, 7, etc. are enclosed in a vacuum vessel (not shown in the figure) in which the pressure is $10^{-4}$ Torr.

This example was experimentally formed using GaAs, quartz oscillator, or single Si crystal, because a lithography technique and an etching technique (for example, anisotropic etching) which have high dimensional repeatability can be easily applied to a fine working, but a method of electro-discharge working or etching working of a metal film, or electroplated metal may also be applied if a desired size tolerance can be obtained thereby. In addition, GaAs, quartz oscillator, or a piezoelectric material (piezoelectric crystal) may be used as the vibrating reeds.

As an example of a method of detecting the displacement of the oscillator, a method of detecting capacitance was used in this example. If the distance between the parallel flat elements is h, the area of the flat elements is S, and the constant carrier applied to the flat elements is $E_{10}\sin\omega_0 t$, the capacitance C of the two parallel flat elements and the change in capacitance $\Delta C$ produced by the change in the distance between the flat elements $\Delta h$ are as follows:

$$C = (\epsilon S/h) \ldots \quad (6)$$

$$\Delta C \alpha \Delta h \ldots \quad (7)$$

$$\Delta Z = (1/\omega_0 C^2)\Delta C \alpha \Delta h \ldots \quad (8)$$

wherein $\Delta z$ is the change in output impedance and becomes a voltage output.

In FIG. 2, reference number 11 denotes a power source for applying a constant voltage to the flat elements 6, 7, and reference numbers 12 to 15 denote voltage transduce circuits for converting the time-dependent term in the capacitances of the detection electrodes 9a, 9b, 10a, 10b due to the displacement of the flat elements 6, 7 into voltages $V_1$ to $V_4$ which become the values corresponding to the distances between the flat elements 6, 7 and the detection electrodes 9a, 9b, 10a, 10b. Reference number 16 denotes a demodulator and reference number 17 denotes a calculator for calculating $(V_1+V_2+V_3+V_4)$ which is mainly used for the drift compensation for the entire detection system. Reference number 18 denotes a frequency modulator for modulating the frequency of the output of demodulator 16 so as to obtain a resonance frequency at which the output of the calculator becomes maximum. Reference number 19 denotes an amplifier. The driven voltage output from the amplifier 19 is applied to the driven electrodes 8a, 8b. Reference number 20 denotes a calculator for calculating $\{(V_1-V_2)-(V_3-V_4)\}/(V_1+V_2+V_3+V_4)$, reference number 21 an amplifier, reference number 22 a converter, reference number 23 a monitor, reference number 24 a calculator for calculating $\{(V_1-V_2)+(V_3-V_4)\}/(V_1+V_2+V_3+V_4)$, reference number 25 an amplifier, reference number 26 a converter, and reference number 27 a monitor.

In this angular velocity and acceleration sensor, since a driven voltage E is applied to the driven electrodes 8a, 8b, the vibrating reed 4 and the flat element 6, and the vibrating reed 5 and the flat element 7 are vibrated at the resonance frequency in opposite directions on the x-axis. Furthermore, this vibration in opposite directions creates a so-called tuning-fork vibration system and thus a vibration system with a small loss of vibration energy toward the outside and resistance to disturbance.

Figure 3:
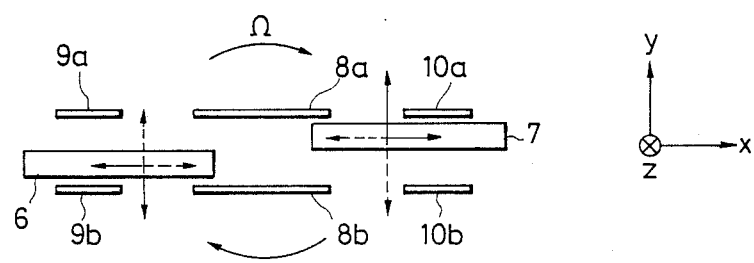
FIGS. 3 and 4 are explanatory views of the operation of the angular velocity and acceleration sensor shown in FIGS. 1 and 2.
Figure 4:
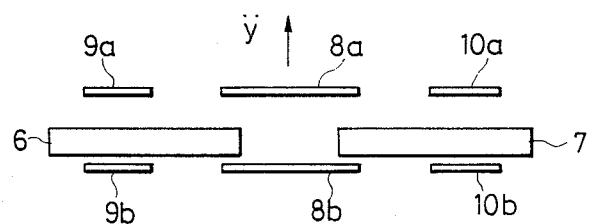

In this situation, as shown in FIG. 3, when an angular velocity is produced in the flat elements 6, 7 in the state of the main vibration on the x-axis shown by the solid-line arrows (or dotted-line arrows), Coriolis force F acts on the vibrating reeds 4, 5 and the flat elements 6, 7, the flat elements 6, 7 are vibrated with the amplitude, which is proportional with Coriolis force F, at the resonance frequency in opposite directions on the y-axis as shown by the solid-line arrows (or dotted-line arrows), and the voltages $V_2$, $V_3$ increase and the voltages $V_1$, $V_4$ decrease in this state as shown in the figure. Therefore, the voltage $\{(V_1-V_2)-(V_3-V_4)\}$ becomes the value proportional to the angular velocity and the value of this angular velocity is thus indicated in the monitor 23. As shown in FIG. 4, when an acceleration $\dot{y}$ is produced on the y-axis, the flat elements 6, 7 are displaced by the reaction force on the y-axis regardless of the movement on the x-axis thereof, as shown in the figure, the voltages $V_2$, $V_4$ increase and the voltages $V_1$, $V_3$ decrease, the voltage $\{(V_1-V_2)+(V_3-V_4)\}$ thus becoming the value proportional to the acceleration $\dot{y}$. Therefore, the acceleration $\dot{y}$ is indicated in the monitor 27.

There is a possibility of forming the vibrating reeds 4, 5 and the flat elements 6, 7 by a two-dimensional cut-out from a piece of silicon single crystal substrate which makes three-dimensional working and assembly as with the conventional sensor unnecessary. The possibility of the arrangement of the driven electrodes 8a, 8b and the detection electrodes 9a, 10a, 9b, 10b in one plane greatly facilitates production, as compared with the conventional sensor which requires the three-dimensional arrangement. The vibration of the vibrating reeds 4, 5 and the flat elements 6, 7 in a vacuum environment reduces the air resistance loss, thus enabling vibration by a small driving force, and also enabling miniaturization in combination with the above-mentioned advantages with respect to production, and this is possible without creating any reduction in detection accuracy. In addition, the large areas of the flat element 6, 7 increase resolution of the detection of capacitance, as seen from the equations (6) and (8). Furthermore, the calculation of the division by the voltage $(V_1+V_2+V_3+V_4)$ in the calculators 20, 24, can be used to adjust the output level of the entire system to compensate for drifts produced when the amplitude and the frequency of the main vibration of the flat elements on the x-axis are changed, thus enabling an accurate angular velocity $\Omega$ and acceleration $\dot{y}$.

EXAMPLE 2

Figure 5:
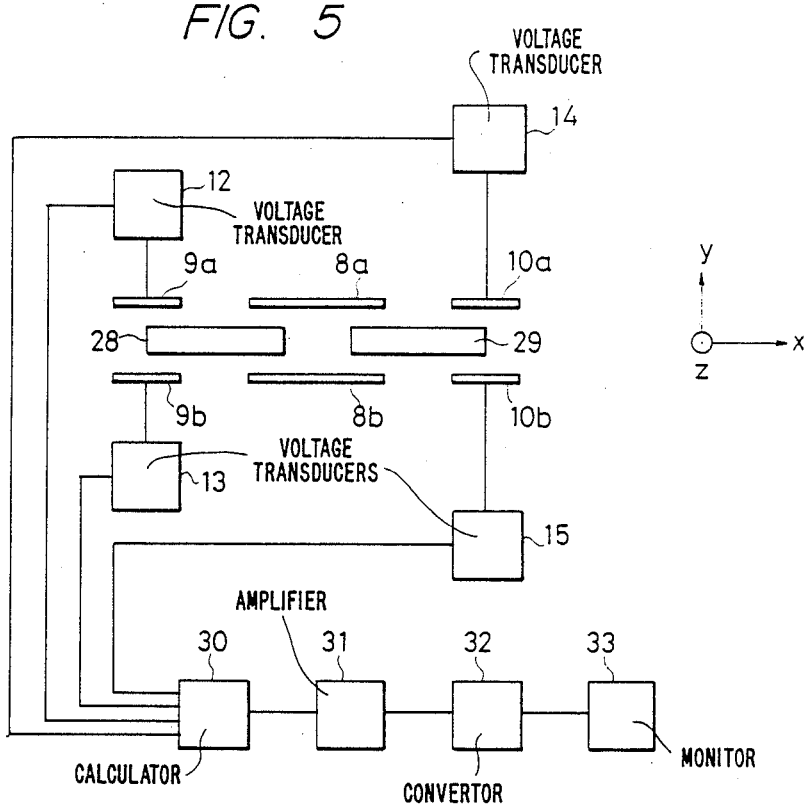
FIG. 5 is a view showing a portion of another angular velocity and acceleration sensor to which the present invention relates.
Figure 12:
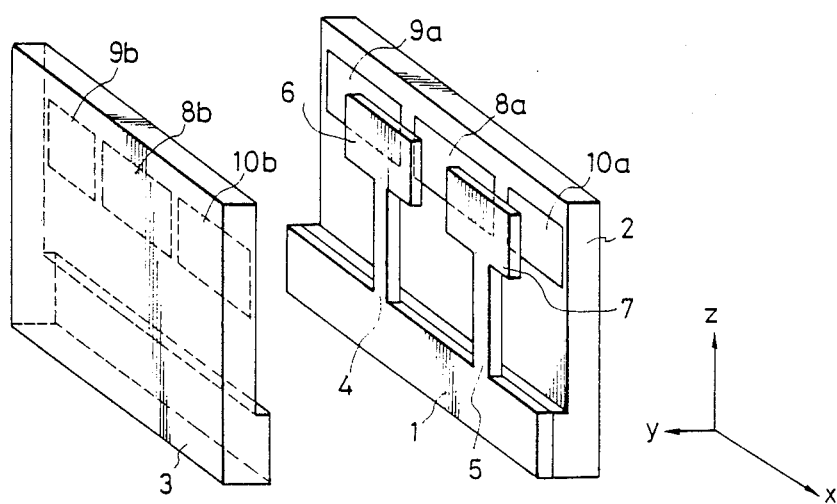
FIG. 12 is a functional diagram showing an embodiment of the angular velocity and acceleration sensors of FIG. 5.

FIG. 5 is a view showing a portion of another angular velocity and acceleration sensor to which the present invention relates. A functional diagram of this sensor is shown in FIG. 12 in which the names and the numbers of the components are the same as those in FIG. 1 except that the areas of the electrodes 9a, 9b, 10a, 10b are different. In FIG. 5, reference numbers 28, 29 denote flat elements provided on the upper portion of the vibrating reeds 4, 5, the left end of the flat element 28 in the figure being placed at the center point between the detection electrodes 9a, 9b, and the right end of the flat element 29 in the figure being placed at the center point between the detection electrodes 10a, 10b. Reference number 30 denotes a calculator for calculating the voltage $\{(V_1+V_2)-(V_3+V_4)\}/(V_1+V_2+V_3+V_4)$, reference number 31 an amplifier, reference number 32 a converter, and reference number 33 a monitor. The other components are the same as those of the angular velocity and acceleration sensor shown in FIGS. 1 and 2.

Figure 6:
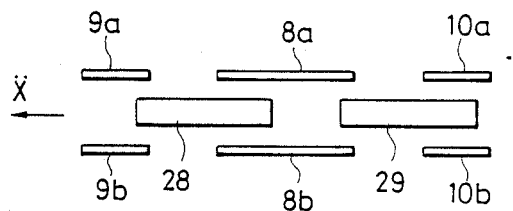
FIG. 6 is an explanatory view of the operation of the angular velocity and acceleration sensor shown in FIG. 5.

In this angular velocity and acceleration sensor, as shown in FIG. 6, when acceleration x is produced on the x-axis, the vibration center of the flat elements 28, 29 on the x-axis are displaced on the same axis, as shown in the figure, the voltages $V_1$, $V_2$ decrease and the voltages $V_3$, $V_4$ increase, and the voltage $\{(V_1+V_2)-(V_3+V_4)\}$ thus becomes a value proportional to the acceleration $\dot{x}$. Therefore, the monitor 33 indicates the acceleration $\dot{x}$. In this manner, the angular velocity and acceleration sensor shown in FIGS. 5 and 12 can indicate the angular velocity $\Omega$, the acceleration $\dot{y}$ on the y-axis, and the acceleration $\dot{x}$ on the x-axis.

EXAMPLE 3

FIG. 7 is a schematic functional diagram showing a portion of another angular velocity and acceleration sensor to which the present invention relates, and FIG. 8 is a plan view of this sensor. In these figures, reference numbers 34, 35 denote flat elements which are provided on the upper portion of the vibrating reeds 4, 5, reference numbers 36a, 36b, 37a, 37b coils which are formed on the flat elements 34, 35, and reference numbers 38a, 38b, 39a, 39b electrodes which are provided on the flat elements 34, 35, a constant voltage being applied to the electrodes 38a, 38b, 39a, 39b. Reference numbers 40a, 40b denote magnetic coils which are provided on the electrode substrates 2, 3. The other components are substantially the same as those of the angular velocity and acceleration sensor shown in FIGS. 1 and 2.

In this angular velocity and acceleration sensor, the vibrating reeds 4, 5 and the flat elements 34, 35 can be vibrated on the x-axis by making oscillating current flow through the coils 36a, 36b, 37a, 37b. When the magnetic coils 40a, 40b are displaced such that a magnetic flux obliquely crosses the coils 36a, 36b, 37a, 37b (for example, at 45 degrees), it is possible to detect excitation and the vibration of the flat elements on at least one of the $\dot{x}$ and y axes.

EXAMPLE 4

Figure 9:
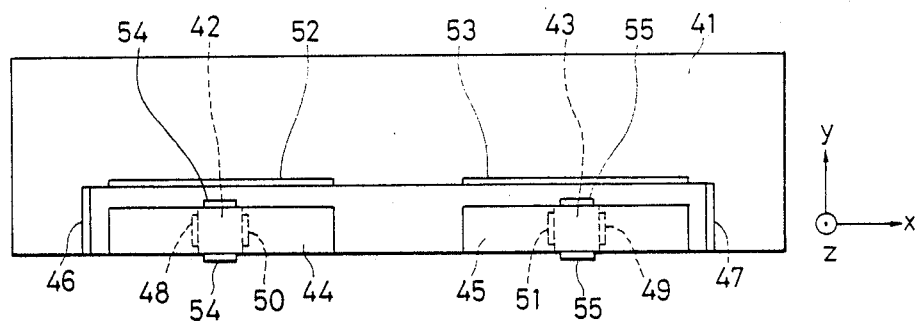
FIG. 9 is a plan view showing a portion of a further angular velocity and acceleration sensor to which the present invention relates.
Figure 10:
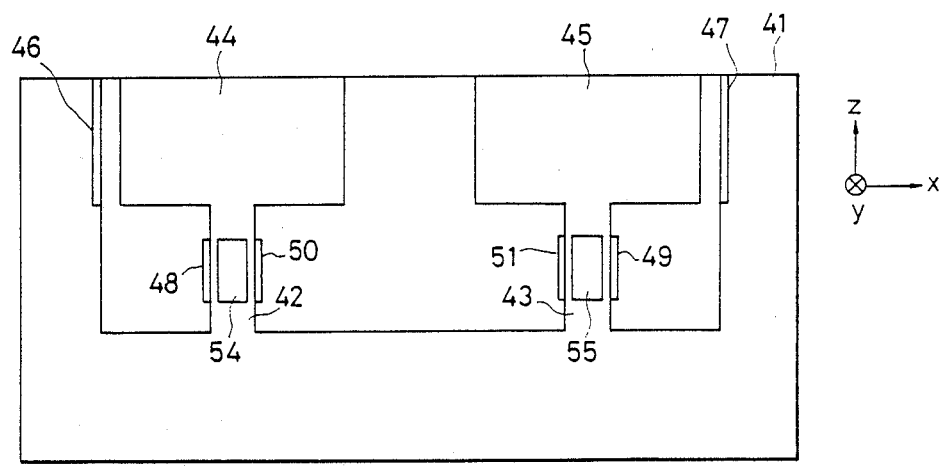
FIG. 10 is a front view of the sensor shown in FIG. 9.
Figure 11:
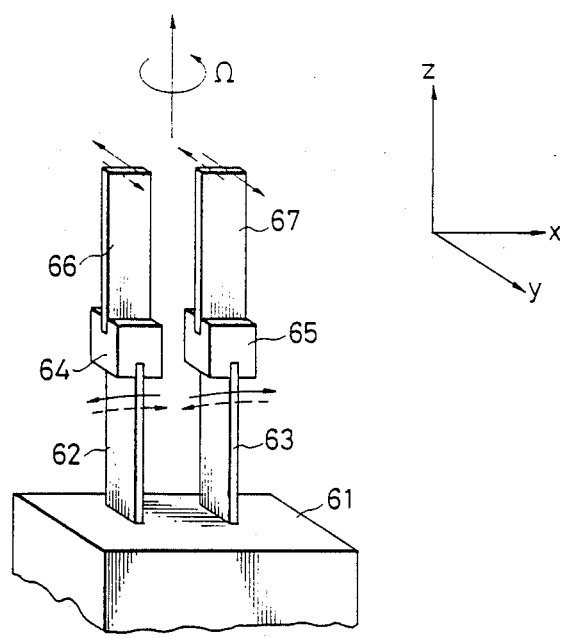
FIG. 11 is a functional diagram showing a portion of a conventional angular velocity and acceleration sensor.

FIG. 9 is a plan view showing a portion of another angular velocity and acceleration sensor to which the present invention relates and FIG. 10 a front view of this sensor. In these figures, reference number 41 denotes a base, reference numbers 42, 43 vibrating reeds which are provided on the base 41, and reference numbers 44, 45 flat elements which are provided on the vibrating reeds 42, 43, driven electrodes 46, 47 being provided opposite to the sides of the flat elements 44, 45. Reference numbers 48 to 51 denote piezoelectric materials for detection which are provided opposite to the surfaces of the flat elements 44, 45. Reference numbers 54, 55 denote piezoelectric materials for damping which are provided on the vibrating reeds 42, 43. The other components are substantially the same as those of the angular velocity and acceleration sensor shown in FIGS. 1 and 2.

In this angular velocity and accelerations sensor, when a driven voltage E is applied to the driven electrodes 46, 47, the vibrating reeds 42, 43 are vibrated on the x-axis and this vibration on the x-axis is detected by the piezoelectric materials for detection 48 to 51. The displacement of the vibrating reeds 42, 43 on the y-axis is detected by the detection electrodes 52, 53. On the basis of the output of the detection electrodes 52, 53, a voltage is applied to the piezoelectric materials 54, 55 so that no displacement of the vibrating reeds 42, 43 is produced. The force acting on the vibrating reeds 42, 43 and the flat elements 44, 45 on the y-axis can be determined by detecting the voltage applied to the piezoelectric materials for damping 54, 55. Consequently, the angular velocity $\Omega$ and the acceleration $\ddot{x}$, $\ddot{y}$ can be determined. In such a manner, the angular velocity and the acceleration x, y can be determined without producing any displacement of the vibrating reeds 42, 43 and the flat elements 44, 45 on the y-axis, and this has the following advantages:

(1) Since the distances between the flat elements 44, 45 and the detection electrodes 52, 53 can be made very small, the sensor can be miniaturized.

(2) It is possible to increase the detection range of angular velocity $\Omega$ and acceleration $\ddot{x}$, $\ddot{y}$, that is to say, its dynamic range.

In the above-mentioned embodiments, the flat elements 6, 7, 28, 29, 34, 35, 44, 45 are provided on the upper portion of the vibrating reeds 4, 5, 42, 43, but these flat elements need not necessarily be provided here.

Furthermore, in the embodiments, the vibrating reeds 4, 5, 42, 43 have square sectional forms, but they may alternatively have any sectional forms in which the spring constants on the x-axis are substantially equal to those on the y-axis. The method for vibrating the vibrating reeds 4, 5, 42, 43 on the x-axis is not limited to that in the embodiments. The method for detecting the displacement of the flat elements 6, 7, 28, 29, 34, 35, 44, 45 is also not limited to that in the embodiments, and it is easy to apply the principle of pickup for detecting a displacement in an optical system, such as a cylindrical lens, using a semiconductor laser ray as is employed for optical disks. In addition, it is possible to combine the vibration and the detection means shown in the embodiments at will. In the embodiments, the displacement of the flat elements 6, 7 is converted into the voltages $V_1$ to $V_4$, but it is possible to output the voltage corresponding to the amplitude of the flat elements 6, 7 by using a rectifier or a filter.

During the excitation of the main vibration on the x-axis, this excitation state can be detected by exciting the vibration on the x-axis such as to produce a vibration component to some extent on the y-axis using an electrode, a piezoelectric material, or a magnetic detection means, all of which should be provided on the y-axis. By this method, it becomes possible to detect both the vibrations on the x and y axes by a detection means which is provided on one axis.

As described above, in the angular velocity and acceleration sensor to which the present invention relates, the oscillator has a simple structure which is not based on assembly because the oscillator is made from a Si single crystal. Furthermore, the entire system comprises the electrodes and the vibrating reeds which are simply adhered to each other so that both its working and its assembly are easy. The lithography technique which involves high accuracy of working and precise dimensions can be applied to this system, which thus can be miniaturized without any loss of accuracy and the present invention therefore has the remarkable effects.

What is claimed is:

1. An angular velocity and acceleration sensor in which a tuning-fork oscillator is vibrated on the main driven vibrating axis and displacement which crosses said main driven vibration axis at right angles is detected so that at least one of angular velocity and acceleration which crosses said main driven vibrating axis at right angles may be detected, said sensor comprising:

a vacuum vessel in which said tuning-fork oscillator is mounted for operation in a vacuum environment;

vibrating reeds associated with said tuning-fork oscillator formed so that the spring constant of said vibrating reeds on said main driven vibrating axis is substantially equal to that on the axis which crosses said main driven vibrating axis at right angles, said vibrating reeds having flat elements each with flat surfaces that are parallel to the main driven vibrating axis;

said flat elements being integrally formed on said material as part of said vibrating reeds and located at the ends of said vibrating reeds; and means including a pair of driven electrodes for driving said tuning-fork oscillator positioned on opposite sides of said flat elements in parallel to said main driven vibrating axis and facing the flat surfaces of said flat elements.

2. An angular velocity and acceleration sensor according to claim 1, in which said vibrating reeds are made from one material selected from the group consisting of single crystal Si, a metal, GaAs, and piezoelectric materials.

3. An angular velocity and acceleration sensor according to claim 1, in which said vibrating reeds are made of a single crystal of Si.

4. An angular velocity and acceleration sensor according to claim 1, in which said vibrating reeds are made of a single crystal of metal.

5. An angular velocity and accelerating sensor according to claim 1, in which said vibrating reeds are made of a single crystal or GaAs.

6. An angular velocity and accelerating sensor according to claim 1, in which said vibrating reeds are made of a single crystal having piezoelectric properties.

7. An angular velocity and acceleration sensor according to claim 1, further comprising a plurality of pairs of detection electrodes located at both sides of said flat elements, said electrodes having flat surfaces that are parallel to said driven vibrating axis and means mounting each pair of detection electrodes flat surfaces to be on opposite sides of and to face the respective flat surfaces of each of said flat elements.

8. An angular velocity and acceleration sensor according to claim 7, wherein the outer ends of said flat elements are located between a respective pair of said detection electrodes whereby displacement of said flat elements that is on an axis which is parallel to said main driven vibration axis is detected so that a signal related to acceleration on an axis which is parallel to said main driven vibrating axis is provided.

* * * * *